United States Patent [19]

Ishikura

[11] Patent Number: 4,651,238

[45] Date of Patent: Mar. 17, 1987

[54] RECORDING MEDIUM READ/WRITE CONTROL SYSTEM

[75] Inventor: Masami Ishikura, Kanagawa, Japan

[73] Assignee: Mitsubishi Denki Kabushiki Kaisha, Tokyo, Japan

[21] Appl. No.: 596,274

[22] Filed: Apr. 3, 1984

[30] Foreign Application Priority Data

Apr. 4, 1983 [JP] Japan .................................. 58-58906

[51] Int. Cl.⁴ .............................................. G11B 5/09
[52] U.S. Cl. ........................................ 360/48; 360/39
[58] Field of Search ..................... 360/48, 46, 39, 40

[56] References Cited

U.S. PATENT DOCUMENTS

| | | | |
|---|---|---|---|
| 3,932,894 | 1/1976 | Arter et al. | 360/51 |
| 4,389,681 | 6/1983 | Tanaka et al. | 360/48 |
| 4,494,156 | 1/1985 | Kadison et al. | 360/48 |
| 4,500,933 | 2/1985 | Chan | 360/48 |

*Primary Examiner*—Vincent P. Canney
*Attorney, Agent, or Firm*—Bernard, Rothwell & Brown

[57] ABSTRACT

A recording medium read/write control system connected with recording medium access units operating in one of a plurality of recording types. The system, when accessing to said access unit, reads in recording type identification information which has previously been set or stored and initializes a control means to the identified recording type for controlling the drive of the access units and transfer of read/write data.

4 Claims, 12 Drawing Figures

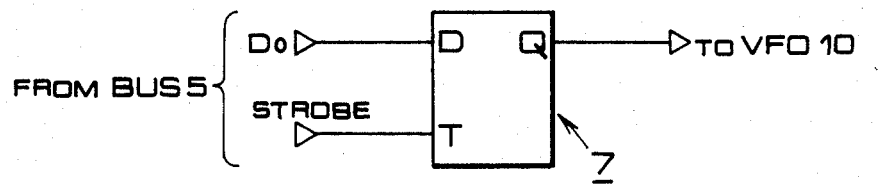
FIG. 4
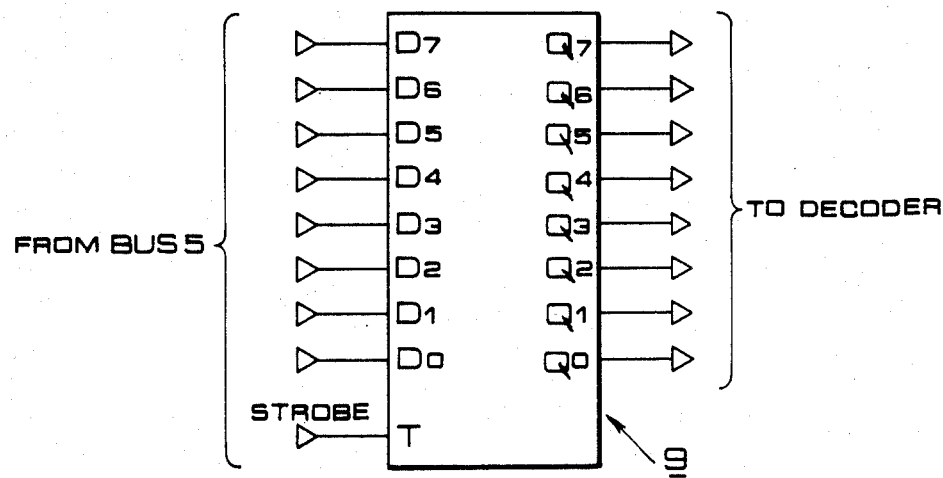
FIG. 5
| FD1 | FD2 | FD3 | FD4 |
|-----|-----|-----|-----|
| 1   | 0   | 0   | 1   |
FIG. 7

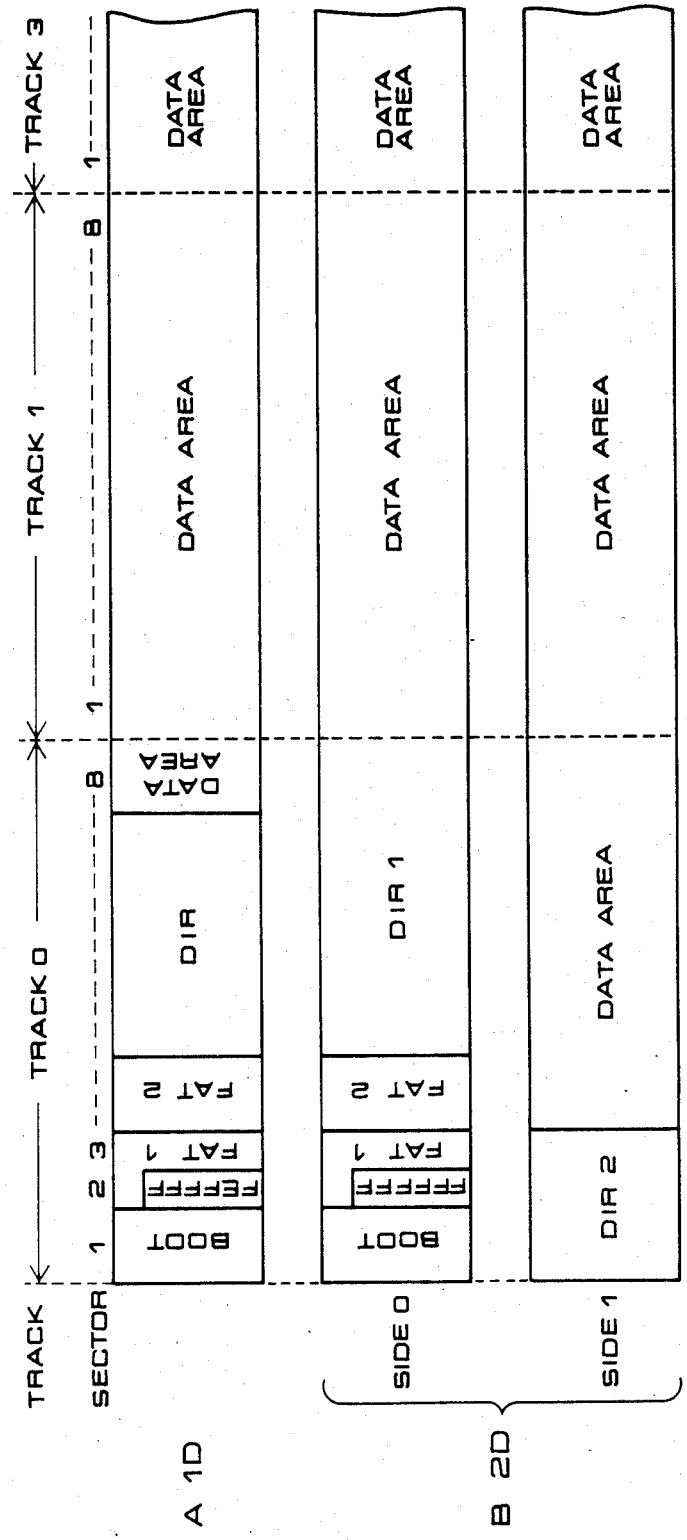

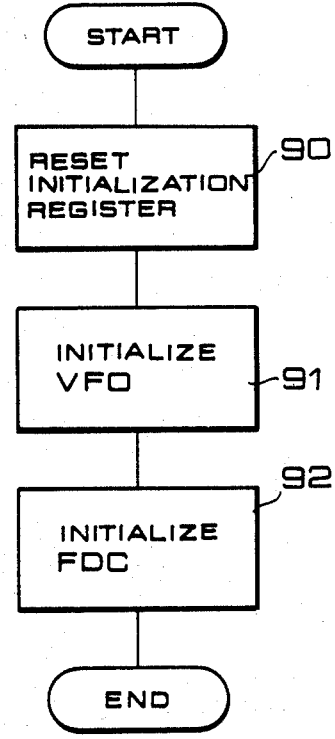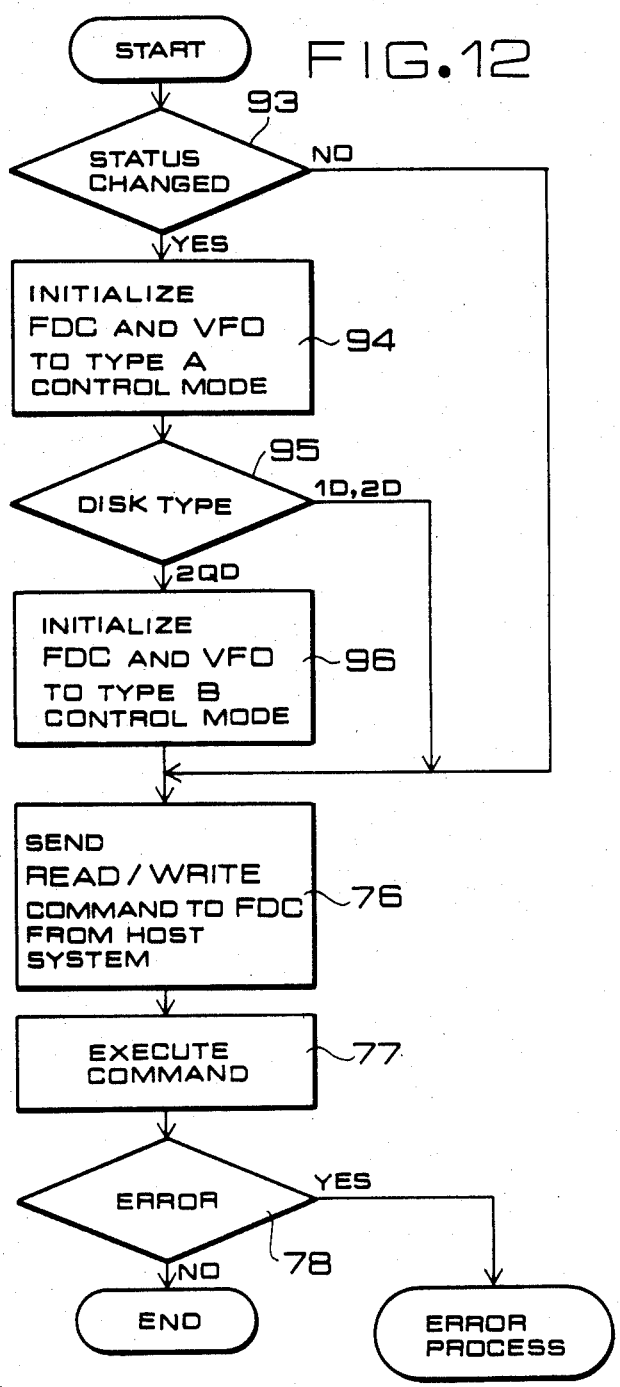

RECORDING MEDIUM READ/WRITE CONTROL SYSTEM

FIELD OF THE INVENTION

The present invention relates to a control system for accessing a recording medium which records information in a certain recording format and, more particularly, to a controller for a floppy disk drive unit which operates in various recording density modes.

BACKGROUND OF THE INVENTION

Owing to the progress of magnetic recording technology, floppy disk drive units with increased recording density have become available. One example is a 5¼"-disk unit having a track density of 96 tracks per inch and a data transfer rate of 500K bits per second, providing an increased recording capacity of about 3.3 times a 5¼"-disk unit having a track density of 48 tracks per inch and a data transfer rate of 250K bits per second, and floppy disk units of different densities are often used in a mixture within a system.

These floppy disk units differ not only in the recording density, but also in the recording format so that they require respective interface controllers to connect to a data processing system. FIG. 1 shows a block diagram of the conventional data processing system having a plurality of floppy disk drive units. A host system 1 having a processor is connected via a floppy disk controller 2a operating at 250K bits/sec for 48 TPI disks, and a floppy disk controller 2b operating at 500K bits/sec for 96 TPI disks, respectively, to floppy disk drive units 3a and 3b loading floppy disks of the first recording density, i.e., 48 TPI, and the second recording desntiy, i.e., 96 TIP. Provision of such controllers for interfacing respective floppy disk units require increased floor space, and this makes the system economically unfavorable.

SUMMARY OF THE INVENTION

Accordingly, it is an object of the present invention to provide a recording medium read/write control system which allows the host system to access a plurality of recording media of different recording formats through a common controller.

Another object of the present invention is to provide a recording medium read/write control system capable of indicating the recording density of the recording medium through a simple setting procedure.

A further object of the present invention is to provide a recording medium read/write control system capable of accessing a recording medium in a minimal access time.

According to one aspect of the present invention, there is provided a means for setting, through a manual operation, identification information indicating the type of recording medium in a controller connected between a recording medium drive unit for handling the recording medium and a processor for processing data from the drive unit. Upon accessing the recording medium, the processor first reads the identification information from the setting means so as to identify the type of recording medium and initializes the controller to the indentified type before starting data transfer to and from the recording medium.

BRIEF DESCRIPTION OF THE DRAWINGS

FIG. 4 is a schematic diagram of the initialization register shown in FIG. 2;

FIG. 5 is a schematic diagram of the device selection register shown in FIG. 2;

FIG. 7 is a diagram showing the internal arrangement of the flag register provided in the memory of the host system;

FIG. 10 is a diagram showing another recording format of the floppy disk drive unit; and FIGS. 11 and 12 are flowcharts showing the operation of the system shown in FIG. 8.

DETAILED DESCRIPTION OF THE PREFERRED EMBODIMENT

Figure 1:
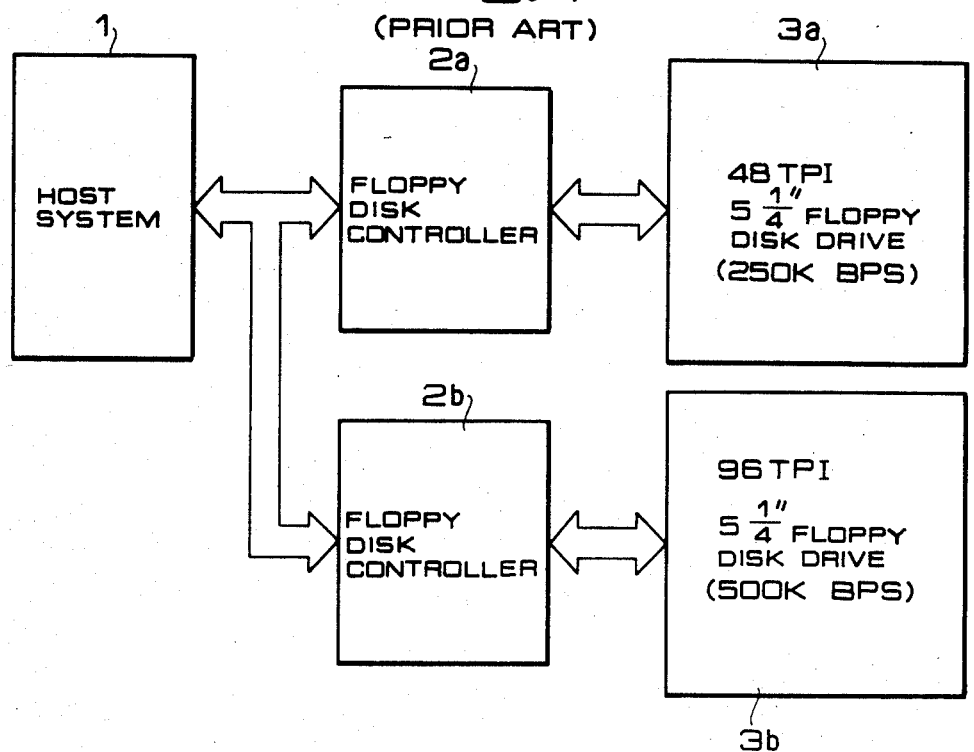
FIG. 1 is a block diagram showing a conventional recording medium read/write control system for connecting two floppy disk drive units having different data transfer rates.
Figure 3:
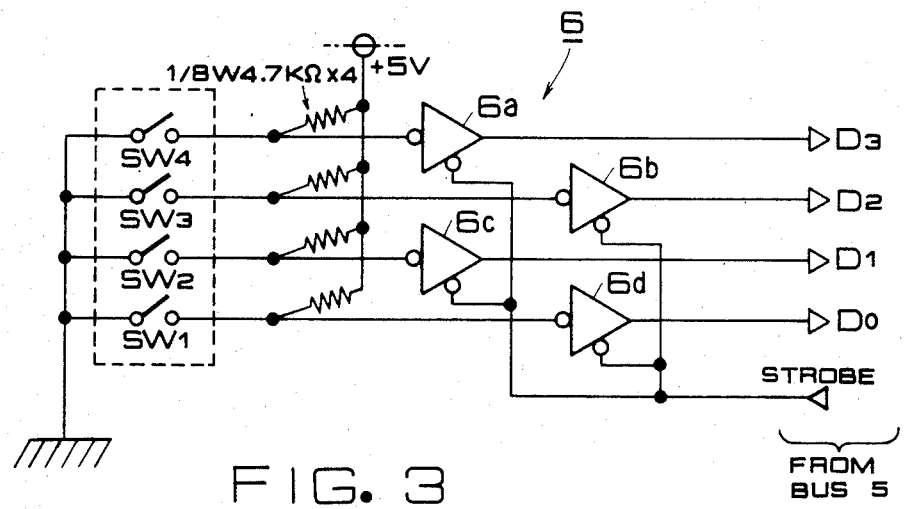
FIG. 3 is a schematic diagram of the device identification switch shown in FIG. 2.
Figure 2:
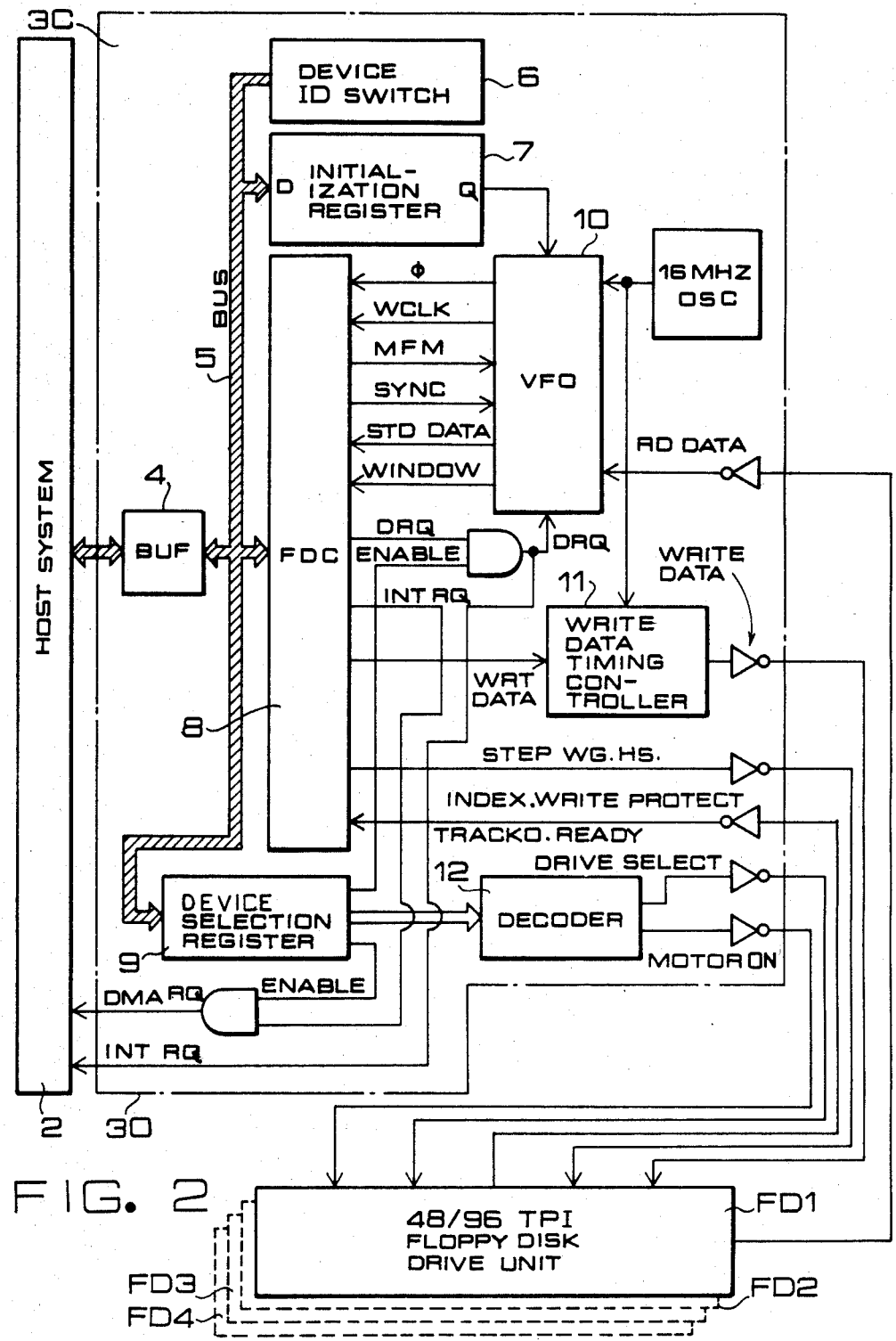
FIG. 2 is a block diagram showing the controller of the recording medium read/write control system according to the present invention.

Referring to FIG. 2, there is shown a block diagram of a control system embodying the present invention wherein a floppy disk controller 3C is provided between a host system 2 and floppy disk drive units FD1 thorugh FD4. The controller 3C has a data transfer bus 5 connected through a bidirectional bus driver 4 to the host system 2. The bus 5 is also connected with a device identification switch 6, an initialization register 7, a floppy disk controller FDC 8, and a device selection register 9 within the controller 3C. The switch 6 includes manually-operated switches SW1-SW4 for representing the type of the disk drive units FD1-FD4 connected to the controller 3C, as shown in FIG. 3. Preferably, the switch SW1 is open to provide "1" when the FD1 is of 48 TPI (type A) or closed to provide "0" when it is of 96 TPI (type B). The remaining switches SW2-SW4 are also set to provide "1" or "0" depending on the type of FD2-FD4, respectively. NAND gates 6a-6d are of the type having a Schmitt trigger function as available, for example, in type LS240 integrated circuit device manufactured by Mitsubishi Electric Corp., and they operate to transmit data $D_0$-$D_3$ set on the respective switches SW1-SW4 onto the bus 5 so that the setup data are transferred to the host system 2 in response to a strobe signal STROBE generated by decoding the address signals from the host system 2.

The initialization register 7 is made of a D-type flip-flop, as shown in FIG. 4, which is a semiconductor integrated circuit device, such as type LS74 manufactured by Mitsubishi Electric Corp. The register 7 operates in such a way that, when a 0 level signal is supplied through the bus 5 to the data input terminal $D_0$, the output terminal Q provides 0 level output to indicate a type-A floppy disk drive unit, and when a 1 level signal is supplied to the input terminal $D_0$, the output terminal Q provides 1 level output to indicate a type-B floppy disk drive unit. Each of Q outputs of the register is connected to a variable frequency oscillator (VFO) 10, which operates to provide read/write timing signals φ, WCLK, and WINDOW of type A or B depending on the state of the Q output signals to cause FDC 8 to operate in the type-A or B mode.

The controller 8 is made of a semiconductor device which is commercially available, such as type μPD765AC device manufactured by Nippon Electric Co., Ltd., and it operates in type-A or B mode in accordance with the timing signals φ, WCLK and WINDOW, and data STD DATA from the VFO 10, and control signals INDEX, WRITE PROTECT, TRACKO, and READY from the floppy disk drive units FD1–FD4 to provide a modified frequency modulation signal MFM, a synchronizing signal SYNC, and a data request DRQ, to the VFO 10, the a step directional signal STEP, a write gate signal WG, an head select HS, and an interrupt request INT RQ to the floppy disk drive units FD1–FD4, and the write data WRT DATA to the write data timing controller 11. The FDC 8 is not the principal portion of the present invention and its detailed specifications are already disclosed and written documents thereof are available from the manufacturer. Therefore, further detailed explanation of this section will not be made in this specification.

The variable frequency oscillator 10 is arranged to receive from the units FD1–FD4 read data RD DATA which is bit phase-modulated because of instability of the disk rotating speed, and provides the window signal WINDOW and reproduced read data STD DATA to the controller 8. The VFO 10 is arranged to operate in the type-A or type-B mode of operation in accordance with the output "0" or "1" of the register 7. The VFO 10 is preferably a semiconductor LSI device of type SED9420C manufactured by Suwa Seikosha Co., Ltd., and a detailed description is given by the manufacturer. Therefore, further explanation thereof will not be made there.

The device selection register 9 is an 8-bit register, each bit being made of a D-type flip-flop D-F/F as shown in FIG. 4, and it is preferably a semiconductor integrated circuit device of type LS273 manufactured by Mitsubishi Electric Corp. The register 9 having outputs connected to a decoder 12 receives at its inputs $D_0$ and $D_1$ address signals for selecting one of the floppy disk drive units FD1–FD4, i.e., address "00" selects FD1, "01" selectd FD2, "10" selects FD3, and "11" selects FD4. Signals received at the inputs $D_2$ and $D_3$ represent the read/write function to be performed by the units FD1–FD4. The register 9 further receives at its inputs $D_4$–$D_7$ data used to activate a motor in the selected FD1–FD4, e.g., when the register 9 receives "1000", the MOTOR SELECT signal for selecting the motor of the FD1 is generated from the decoder 12. Further, data read into the register 9 is transferred to the decoder 12 for producing the DRIVE SELECT signal to select one of the FD1–FD4 and the MOTOR ON signal for activating the motor.

In operation, the setting of the device identification switch is read first before the host system issues a command for controlling the floppy disk drive units FD1–FD4. the host system 2 compares the contents of the switch setting with the device number of the drive unit to be controlled, and identifies whether the drive unit is of 48 TPI (type A) or the 96 TPI (type B). Then, the host system sends a command to the initialization register 7 so as to initialize the FDC 8 and VFO 10 to match the selected device type. Following the initialization of the FDC 8 and VFO 10, the host system 2 executes the READ or WRITE command. Loading of the initialization signal and initialization of the FDC 8 and VFO 10 are carried out only when the selection of drive units is changes to that the unit access time can be minimized.

Figure 6:
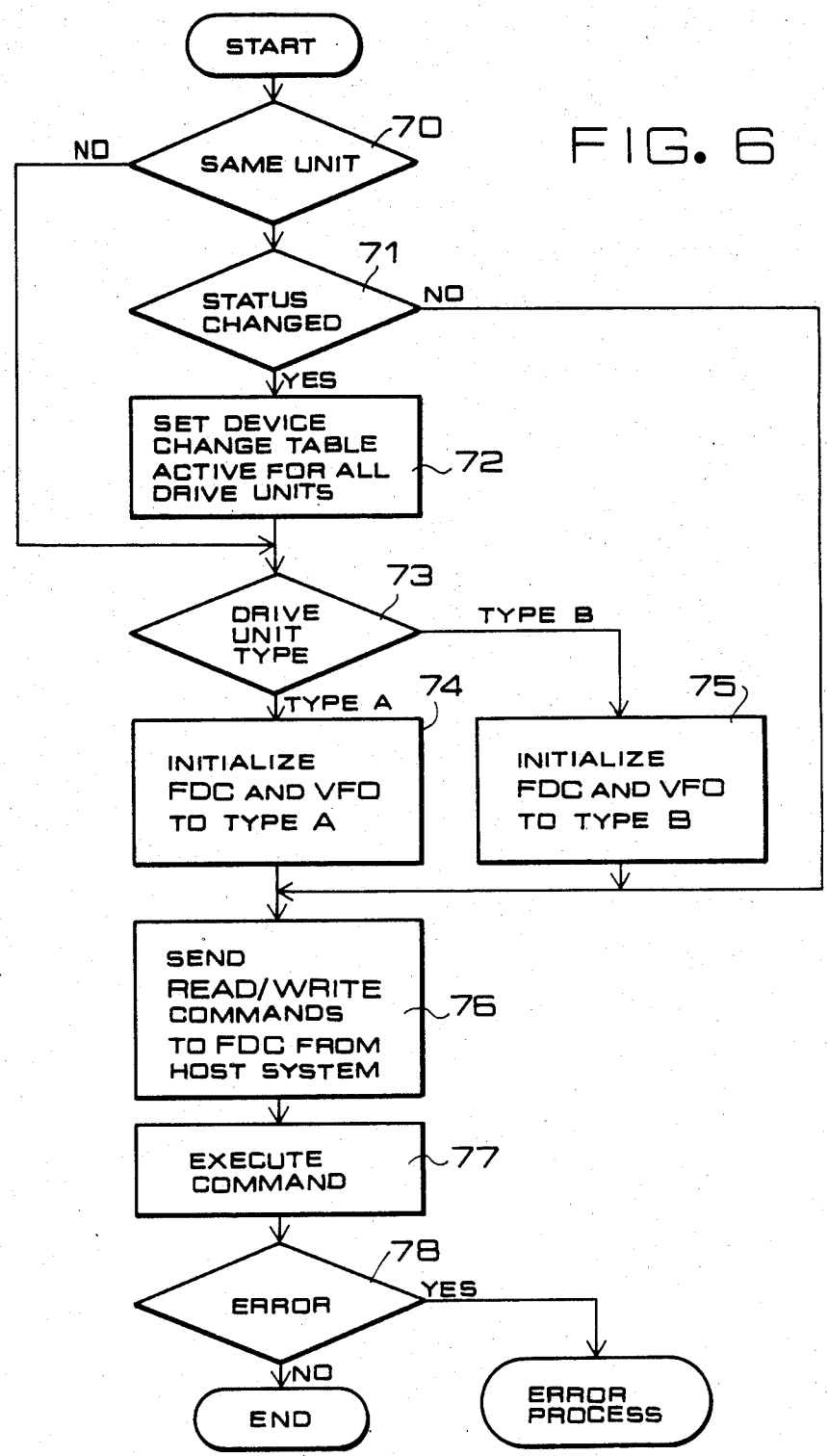
FIG. 6 is a flowchart explaining the operation of the system shown in FIG. 2.

The operation of the foregoing embodiment will be described in more detail with reference to the flowchart shown in FIG. 6. The sequence of operations begins when the floppy disk control command is issued by the host system 2 in response to an operator request. Step 70 checks whether a different drive unit is requested, i.e., whether or not the requested drive unit is the same on which has been selected by the host system 2 in the previous cycle. This determination step is achieved in such a way that, for example, a 4-bit device selection change table corresponding to the drive units FD1–FD4 is provided in the memory of the host system 2 and the host system 2 checks the status of the bits. If the bits have value "0", indicating that the selection of drive unit has not been changed, the operation then proceeds to a step 71. The step 71 checks the status of the flags in the memory of the host system 2 for determining whether the recording medium on the selected drive unit has been replaced. The flag is set to "1" by the status signal sent from the controller 3C when the recording medium has been changed. If flag is "1", the operation proceeds to step 72. Since the recording medium has been replaced in step 72, all bits the drive unit in the table shown in FIG. 7 are set to "1". Then, the operation proceeds to step 73. Step 73 is executed when the decision step 70 has provided the result of NO, and it stores the contents of the switches SW1–SW4 in the memory in response to the IN command from the host system 2 so as to determine the type of the selected drive unit. If the drive unit is found to be type A, the operation proceeds to step 74 to set the register 7 to "0" so as to designate type A for the FDC 8 and VFO 10, and also set the corresponding bit of the table of FIG. 7 to "0". If, on the other hand, the drive unit is found to be type B, the operation proceeds to step 75 to set the register 7 to "1" so as to designate type B for the FDC 8 and VFO 10 and, at the same time, set the corresponding bit of the table of FIG. 7 to "0". Setting of the corresponding bit of the table of FIG. 7 to "0" allows the decision 71 to skip the operations of steps 72-75 the same drive unit is selected again in the subsequent access cycle.

The next step 76 is executed when the decision step 71 has provided a result of "NO" or when step 74 or 75 has been completed. In this step 76 the host system 2 sends a read/write command to the initialized FDC 8. The command is executed in the step 77, and in the step 78, a check is made whether an error generated.

These procedures are valid for the normal sequence of operational but for the start-up of the host system 2, it is desirable to initialize the FDC 8 and VFO 10 to the most utilized type, e.g., type A, and set all bits of the table of FIG. 7 to "0".

Figure 8:
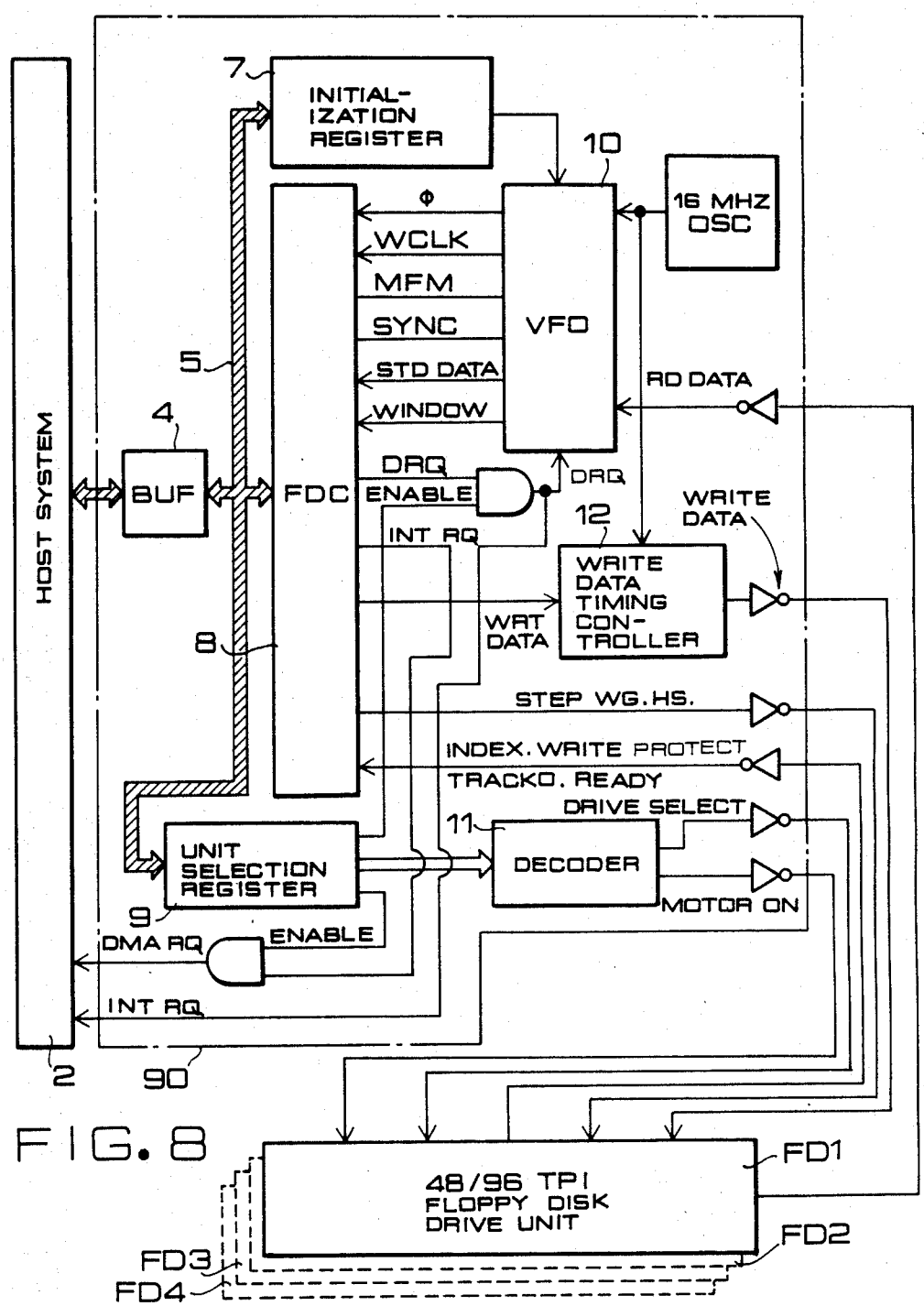
FIG. 8 is a block diagram showing another embodiment of the controller.

Another embodiment of the invention will be described with reference to FIG. 8, in which portions identical to those of FIG. 2 are referred to by the same symbols. This arrangement differs from the previous embodiment in that a predetermined pattern of information is recorded on the floppy disk and an operation similar to that of the previous embodiment is carried out by reading out the pattern from the disk. Namely, identification data for discriminating the recording type is recorded on track 0 on side 0 of each floppy disk and the host system reads out the pattern to identify the type of recording and initialize the VFO 10 correspondingly, thereby allowing the use of both types of floppy disks. The identification data recorded on track 0 on side 0 is set to indicate 250K bits/sec for both types of disks, so that the disk can be identified without executing reinitialization when the VFO 10 is once initialized to type A.

Figure 9:
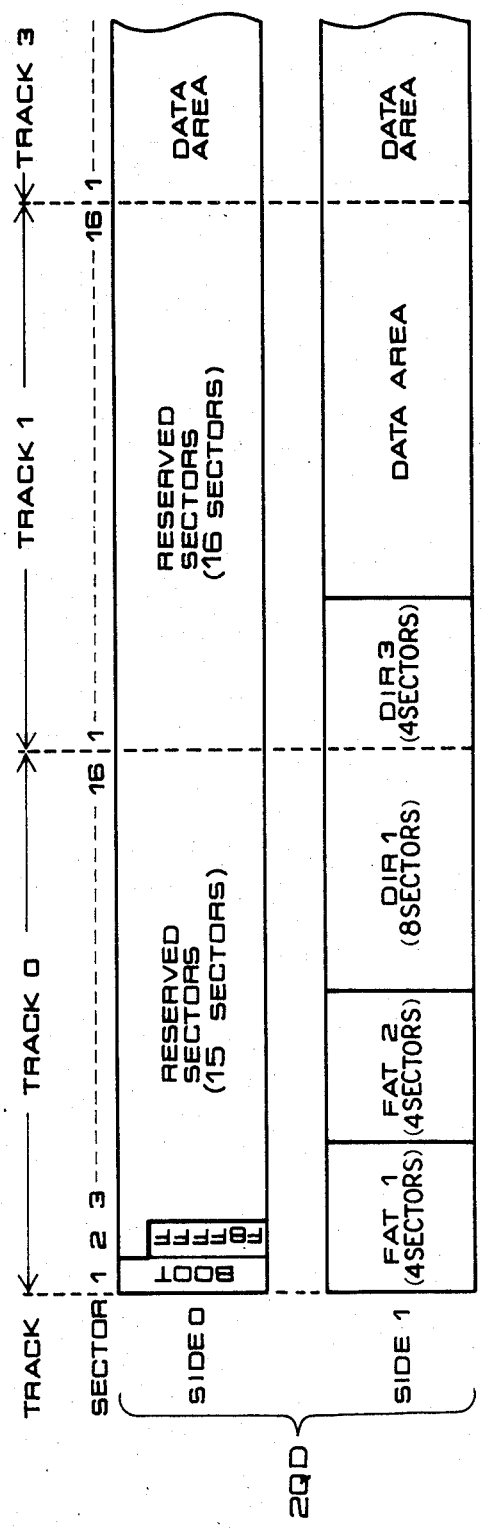
FIG. 9 is a diagram showing the recording format of the floppy disk drive unit.

There are three kinds of floppy disks: (1) double-sided, high density (96 TPI, 500K bits/sec) disk called sheet 2QD, (2) single-sided, double density (48 TPI, 250K bits/sec) floppy disk called sheet 1D, and (3) double-sided, double-density floppy disk called sheet 2D. The sheet 2QD has a data format as shown in FIG. 9. Side 0 represents the front side of the disk, while side 1 represents the rear side of the disk. "BOOT" in sector 1 is the abbreviation of "boot strap", and in this sector, the program is stored for loading the operation system program from the floppy disk to the memory of the host system 2. Data stored in sector 2 represents the type of recording medium, and data "F8FFFF" shown in the figure indicates sheet 2QD. The sectors 2-16 (15 sectors) are specified as reserved or blank area. Track 0 consisting of BOOT, F8FFFF and a reserved area is always recorded in type A, while remaining tracks are recorded in type B for the 2QD sheet. "FAT" is the abbreviation of "file allocation table", and these sectors are used by the operating system to control files in sector units. The record length of each file is obtained from this information. "DIR" is the abbreviation of directory, and these sectors are used as an index of files recorded on this disk.

Sheet 1D has a data format as shown by A in FIG. 10, and it is identical to the format of FIG. 9 except that all recording areas are recorded in type A and identification data pattern FEFFFF is recorded after the BOOT area. Sheet 2D has a data format as shown by B in FIG. 10, and it is also recorded in type A with identification data pattern FFFFFF being recorded after the BOOT area as in sheet 1D.

The floppy disk used in this embodiment has a data structure similar to that of a conventional floppy disk so that no detailed explanation will be required here. However, the area of track 0, side 0 of sheet 2QD is recorded in type A and identification data, as shown below, is appended to each disk.

Identification data:
Type A, sheet 1D ... FEFFFF
Type A, sheet 2D ... FFFFFF
Type B, sheet 2QD ... F8FFFF The identification data pattern is of course not limited to those shown above.

Now, the initializing operation of the present embodiment will be described with reference to the flowchart of FIG. 11. First, after power has been turned on, the initial values are set. Namely, in step 90, the host system 2 sends 0's to the register 7 shown in FIG. 8. Then, in steps 91 and 92, the VRO 10 and FDC 8 are initialized in response to the 0's output from the register 7, and initialization for type A control is completed.

Next, the normal operation will be described with reference to FIG. 12. When a floppy disk is replaced, the drive units FD1-FD4 shown in FIG. 8 are put temporarily in a non-ready state, and this is detected by the FDC 8 and indicated to the host system 2. Upon reception of this signal, the host system 2 sets the INT flag of the table to "1" as in the previous embodiment.

In step 91, the host systm 2 determines whether or not the INT flag is "1". If the flag is found to be "1", indicating that the disk has been replaced, the operation proceeds to stp 94. If, on the other hand, the flag is found to be "0", indicating that the disk is the same as the previous type (A or B), the steps 76 and 77 are carried out as has been described in connection with the flowchart of FIG. 6. In step 94, since the code for identifying sheet 2QD, 1D and 2D is recorded commonly in type A, the VFO 10 in FIG. 8 is initialized to type A as in the processing described in connection with FIG. 11. Then, the operation proceeds to step 95 which checks for the type of the presently loaded disk. In step 95, it reads out identification data from sector 2 on track 0, side 0 of the disk (1D, 2D or 2QD), and if it is "FEFFFF" or "FFFFFF" indicating type A (1D or 2D, respectively), the operation proceeds to step 76. If, on the other hand, the identification code is "F8FFFF", indicating type B (2QD), the operation proceeds to step 96. In step 96, the host system 2 sends 1's to the register 7 in FIG. 8 so as to set the VFO 10 to type B. Following execution of the steps 76 and 77, the sequence of operations is completed.

What is claimed is:

1. A recording medium read/write control system having control means connected with at least one recording medium access means which loads a recording medium for reading or writing informationin one of a plurality of recording types selectively, said control means being adapted to control the drive of said access means in correspondence to a selected recording mode and control the transfer of said read/write information, said control system comprising:
   hold means for holding identification information which represents the type of recording of said recording medium;
   processing means which receives said identification information read from said hold means when said recording medium is accessed and identifies the type of recording of said recording medium; and
   means for memorizing the result of identification by said processing means and initializing said control means so that said control means operates in said selected type;
   said processing means comprising a program-controlled processor which provides an identification result to said initializing means only when identification information received from said hold means differs from that of the previous read/write access;
   said initializing means including a memory means for storing an identification result provided by said processor.

2. A recording medium read/write control system according to claim 1, wherein said hold means includes a plurality of switches which are set in correspondence to the type of recording media loaded on said access means.

3. A recording medium read/write control system according to claim 1, wherein said hold means includes a predetermined area of said recording medium loaded on said access means, said predetermined area of said medium storing said identification information in a common recording type.

4. A recording medium read/write control system according to claim 3, wherein said identification information is recorded in a recording type which is used frequently.

* * * * *